United States Patent
Kooima

[11] Patent Number: 6,033,177
[45] Date of Patent: Mar. 7, 2000

[54] FORKLIFT ATTACHMENT

[76] Inventor: Roger D. Kooima, 44 Park La., Box 203, Canton, S. Dak. 57013

[21] Appl. No.: 09/112,840

[22] Filed: Jul. 10, 1998

[51] Int. Cl.$^7$ ................................................ B60P 3/12
[52] U.S. Cl. .................. 414/438; 254/2 R; 414/563; 414/664; 414/642; 414/553
[58] Field of Search ................ 414/607, 917, 414/563, 628, 629, 639, 640, 642, 663, 664, 668, 553, 546, 539, 540, 458, 459, 426, 428; 280/402; 187/222; 254/2 R, 3 R

[56] References Cited

U.S. PATENT DOCUMENTS

| | | | |
|---|---|---|---|
| 4,101,040 | 7/1978 | Stolley | 414/458 X |
| 4,664,576 | 5/1987 | Coe | 414/607 X |
| 4,781,516 | 11/1988 | Cripe et al. | 414/563 X |
| 4,838,753 | 6/1989 | Gehman et al. | 414/563 |
| 5,165,840 | 11/1992 | McKinney | 414/607 |
| 5,593,270 | 1/1997 | Richards | 414/458 |

*Primary Examiner*—Frank E. Werner
*Attorney, Agent, or Firm*—Kaardal & Associates, PC

[57] ABSTRACT

A forklift attachment for attachment to a fifth-wheel hitch assembly of a vehicle for permitting the lifting of loads. The forklift attachment includes a ground engaging support carriage having an towing tongue designed for attachment to a fifth-wheel hitch assembly of a vehicle. A pair of lifting arms are pivotally mounted to the support carriage. A pair of lifting devices are provided for raising and lowering the lifting arms with respect to the support carriage and a pair of tilting devices are provided for tilting the lifting arms with respect to the support carriage.

20 Claims, 13 Drawing Sheets

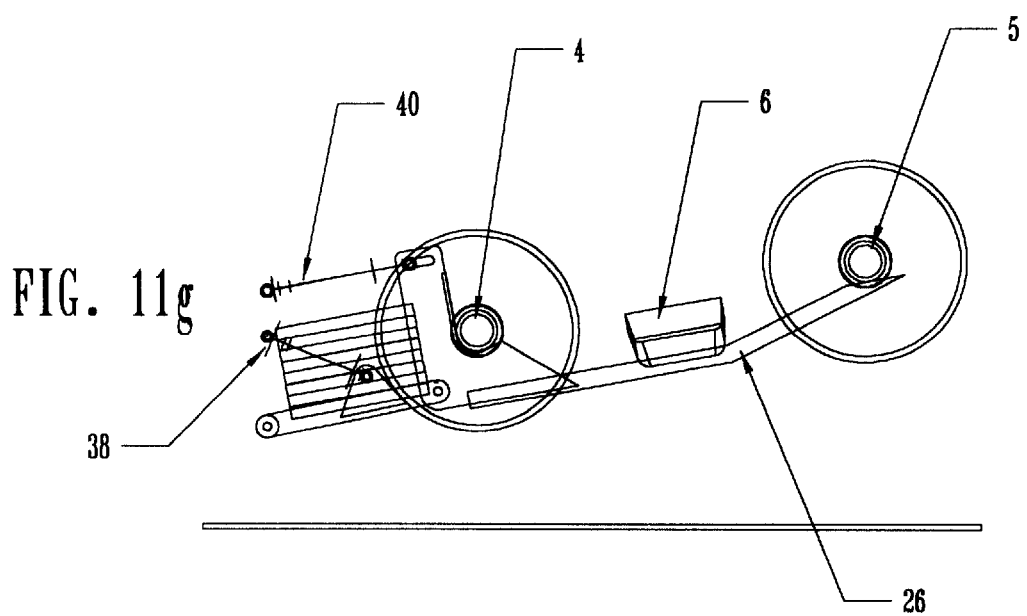

FORKLIFT ATTACHMENT

BACKGROUND OF THE INVENTION

1. Field of the Invention

The present invention relates to rail bogie lifting devices and more particularly pertains to a new forklift attachment for attachment to a fifth-wheel hitch assembly of a vehicle for permitting the lifting of loads.

2. Description of the Prior Art

The use of rail bogie lifting devices is known in the prior art. More specifically, rail bogie lifting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,781,516; U.S. Pat. No. 3,941,264; U.S. Pat. No. 4,062,454; U.S. Pat. No. 5,582,501; U.S. Pat. No. 5,584,629; U.S. Pat. No. 4,215,963; U.S. Pat. No. 5,415,516; U.S. Pat. No. 3,288,315; U.S. Pat. No. Des. 245,606; U.S. Pat. No. Des. 246,845; PCT Patent No. WO 94/13509 (inventors: Hull et al); and PCT Patent No. 84/01752 (inventor: Silva).

Dual mode articulated rail-highway vehicle system which employ separable rail bogies have been developed. In this type of system, semi-trailer bodies with retractable highway wheel assemblies are attached to detachable rail bogies and the semi-trailer bodies are then coupled end to end to form trains. No conventional rail cars are used thereby reducing weight, cost, and maintenance. The rail bogies are left behind on the rail when the semi-trailer bodies are taken by normal tractors to their destinations over highways. This has developed a need for devices for lifting and transporting these types of rail bogies around a railway yard. With reference to FIGS. 7 and 8, rail bogies include end rail bogies 3 and intermediate rail bogies 2 such as the type manufactured by Wabash National Corporation, P.O. Box 6129 Lafayette, Ind. 47903 under the trade names Coupler-Mate Rail Bogie (for end rail bogies 3) and Intermediate Rail Bogie (for intermediate rail bogies 2. Rail bogies 2,3 are built so that the main body of either of the rail bogies 2,3 is set onto the axle journals or bearing mounted on the axles 4,5, being separated by a spring suspension system. The axles 4,5 are designed to accept the load from the top only, and are not designed to have any loading from the bottom. The axles 4,5 are kept in place by a retainer or ear bolted under each end of each axle. These ears can be easily broken off if the rail bogies are handled improperly. Also, if improperly handled, the coil spring suspension mounted between the main body of the bogie and journal housing can be cocked out of position, causing broken coil springs. The bogies have a pan 6 that is mounted between the two axles, several inches lower than the axles. Since this pan 6 is part of the main body of the bogie, lifting on it will also result in improper lifting on the suspension and axles of the bogie which can break the retainer ears or cock the springs. Therefore, proper lifting must be done on the axle/wheel assemblies 4,5 only.

Another problem is that the cost of a forklift that has the size necessary to move the bogies is very large. The forklift must be able to pick up and carry 19,000 pounds (the typical weight of an end rail bogie 3) at a distance of 50 inches out away from the mast of the forklift.

SUMMARY OF THE INVENTION

In view of the foregoing disadvantages inherent in the known types of rail bogie lifting devices now present in the prior art, the present invention provides a new forklift attachment construction wherein the same can be utilized for attachment to a fifth-wheel hitch assembly of a vehicle for permitting the lifting of loads.

The general purpose of the present invention, which will be described subsequently in greater detail, is to provide a new forklift attachment apparatus and method which has many of the advantages of the rail bogie lifting devices mentioned heretofore and many novel features that result in a new forklift attachment which is not anticipated, rendered obvious, suggested, or even implied by any of the prior art rail bogie lifting devices, either alone or in any combination thereof.

To attain this, the present invention generally comprises a ground engaging support carriage having an towing tongue designed for attachment to a fifth-wheel hitch assembly of a vehicle. A pair of lifting arms are pivotally mounted to the support carriage. A pair of lifting devices are provided for raising and lowering the lifting arms with respect to the support carriage and a pair of tilting devices are provided for tilting the lifting arms with respect to the support carriage.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new forklift attachment apparatus and method which has many of the advantages of the rail bogie lifting devices mentioned heretofore and many novel features that result in a new forklift attachment which is not anticipated, rendered obvious, suggested, or even implied by any of the prior art rail bogie lifting devices, either alone or in any combination thereof.

It is another object of the present invention to provide a new forklift attachment which may be easily and efficiently manufactured and marketed.

It is a further object of the present invention to provide a new forklift attachment which is of a durable and reliable construction.

An even further object of the present invention is to provide a new forklift attachment which is susceptible of a low cost of manufacture with regard to both materials and labor, and which accordingly is then susceptible of low prices of sale to the consuming public, thereby making such forklift attachment economically available to the buying public.

Still yet another object of the present invention is to provide a new forklift attachment which provides in the apparatuses and methods of the prior art some of the advantages thereof, while simultaneously overcoming some of the disadvantages normally associated therewith.

Still another object of the present invention is to provide a new forklift attachment for attachment to a fifth-wheel hitch assembly of a vehicle for permitting the lifting of loads.

Yet another object of the present invention is to provide a new forklift attachment which includes a ground engaging support carriage having an towing tongue designed for attachment to a fifth-wheel hitch assembly of a vehicle. A pair of lifting arms are pivotally mounted to the support carriage. A pair of lifting devices are provided for raising and lowering the lifting arms with respect to the support carriage and a pair of tilting devices are provided for tilting the lifting arms with respect to the support carriage.

Still yet another object of the present invention is to provide a new forklift attachment that allows standard and commonly available vehicles to transport rail bogies instead of using an expensive specialized forklift for the task.

Even still another object of the present invention is to provide a new forklift attachment that lifts the rail bogies from under their axles so that damage and malfunctions to the rail bogies is minimized.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 11a–g are a set of sequential schematic side views of the positioning of the lifting arms when used to lift a rail bogie.

DESCRIPTION OF THE PREFERRED EMBODIMENT

Figure 1:
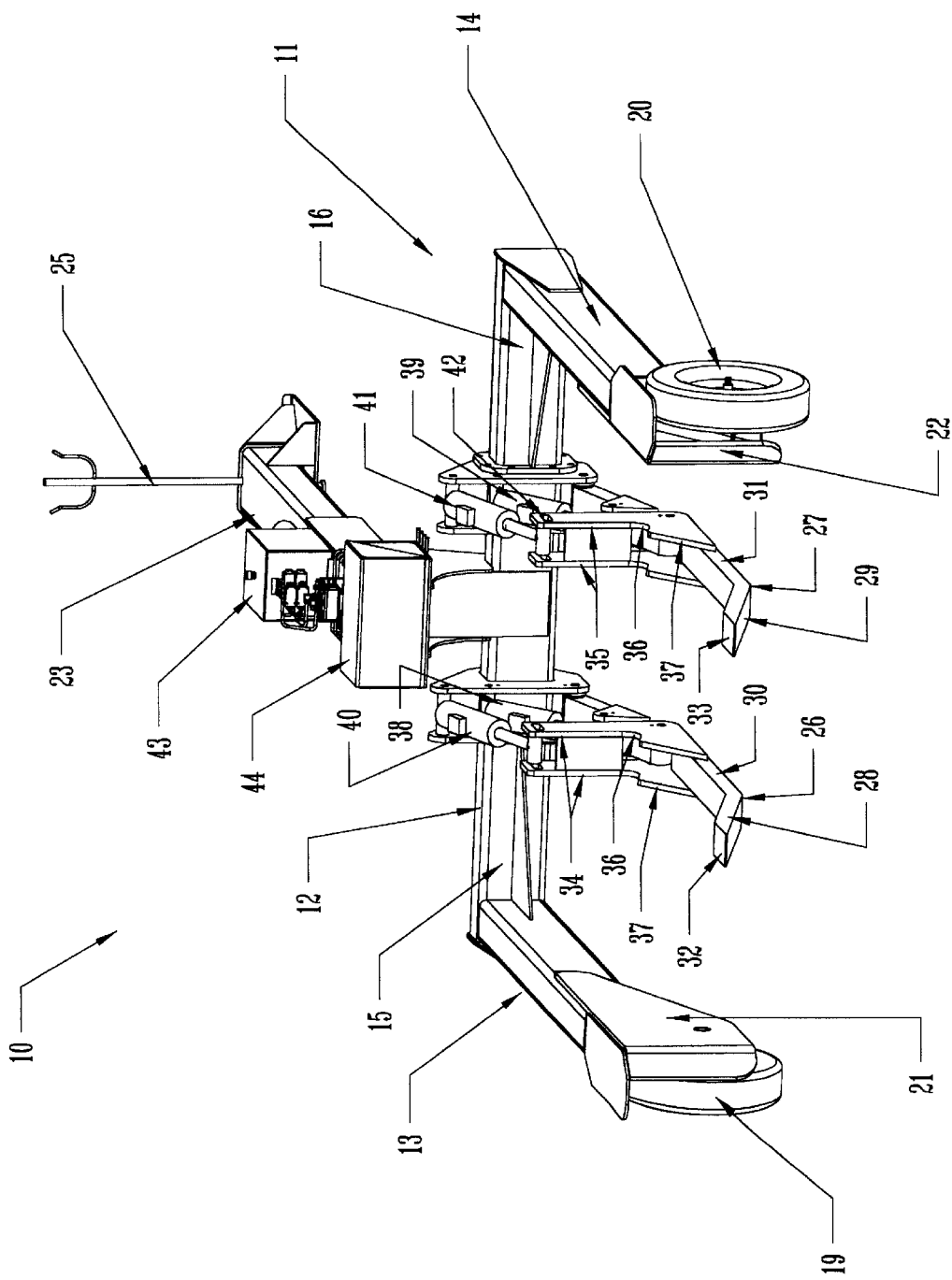
FIG. 1 is a schematic rear perspective view of a new forklift attachment according to the present invention.
Figure 2:
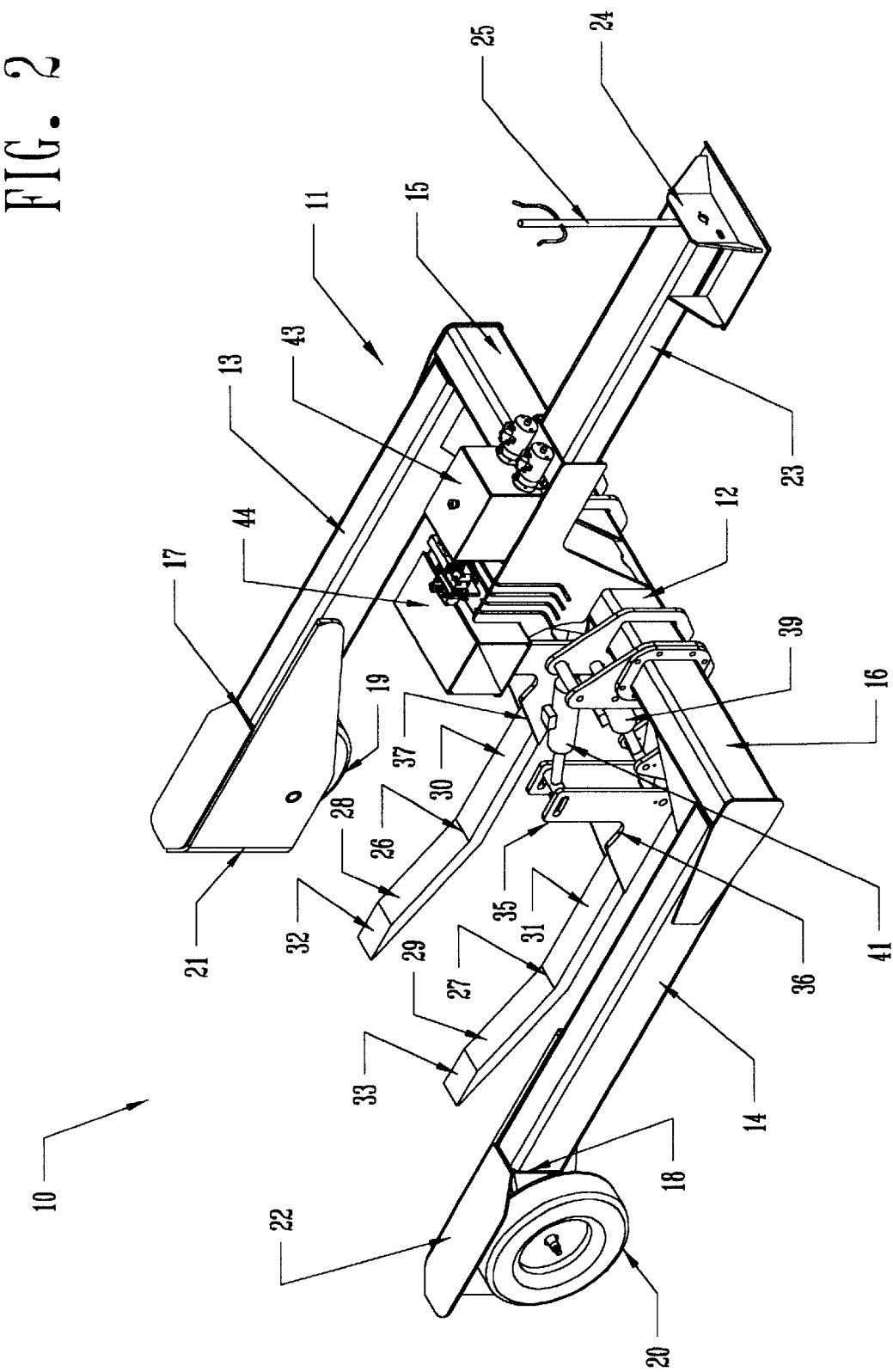
FIG. 2 is a schematic front perspective view of the present invention.
Figure 3:
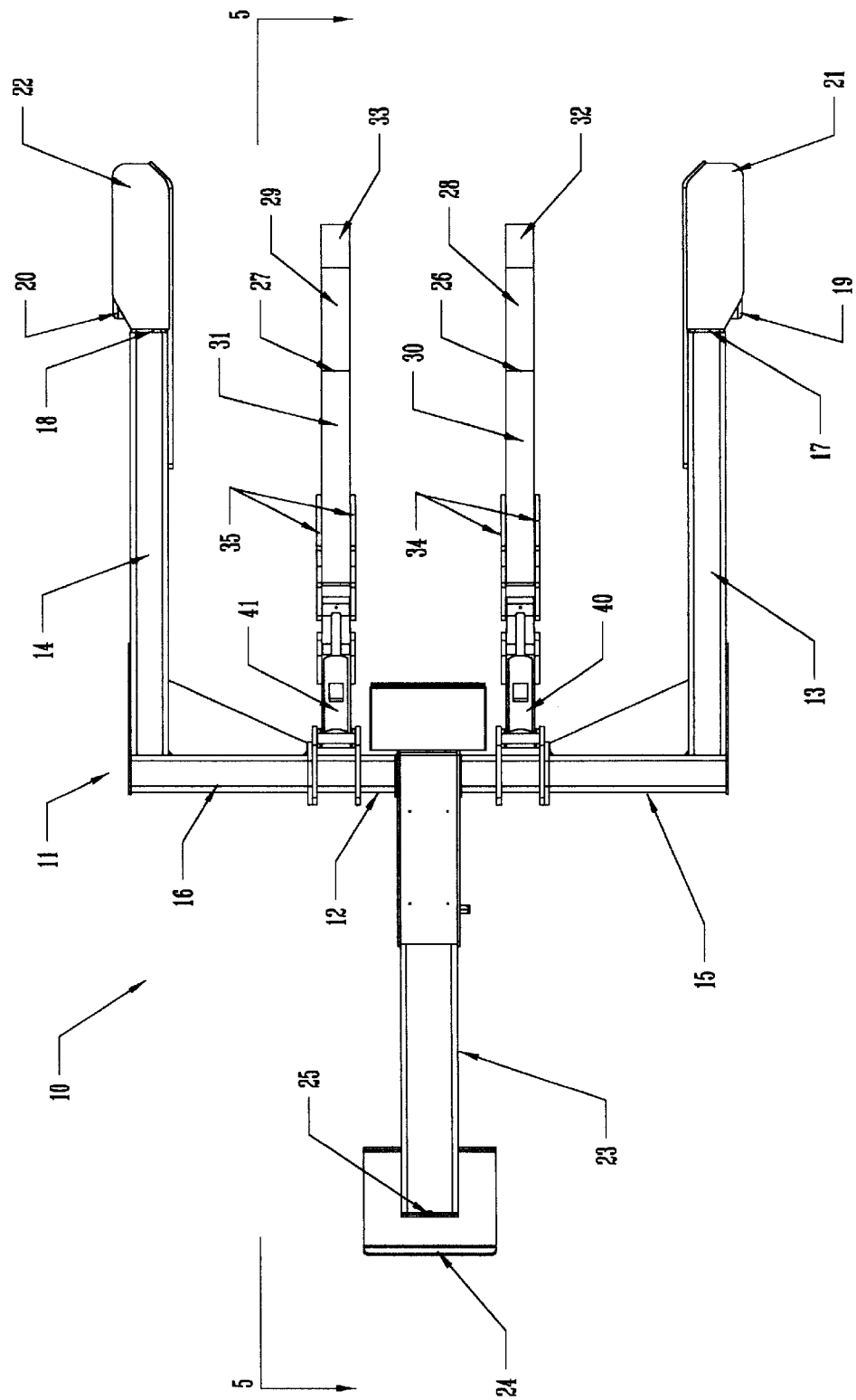
FIG. 3 is a schematic top plan view of the present invention.
Figure 4:
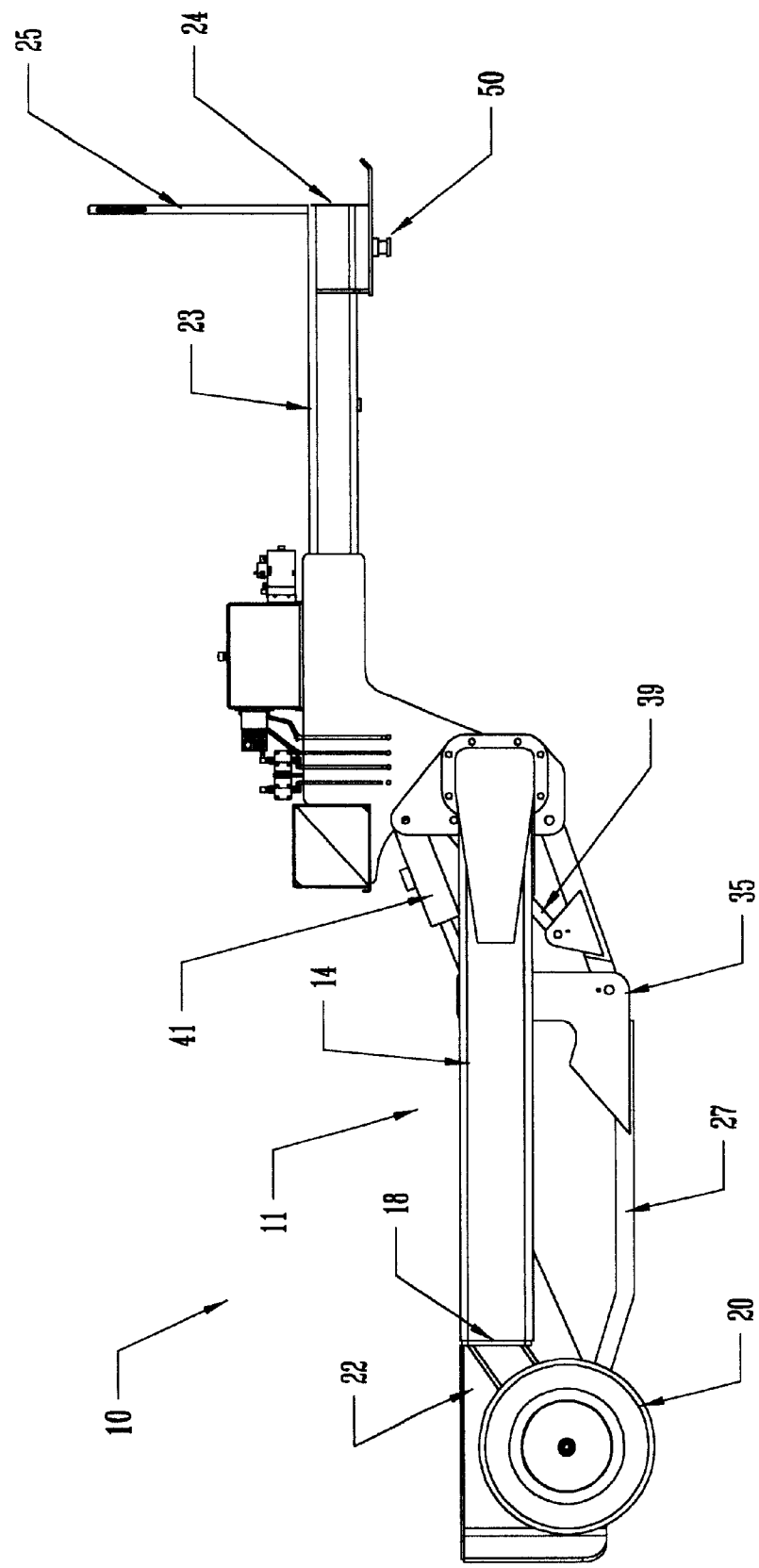
FIG. 4 is a schematic side view of the present invention.
Figure 5:
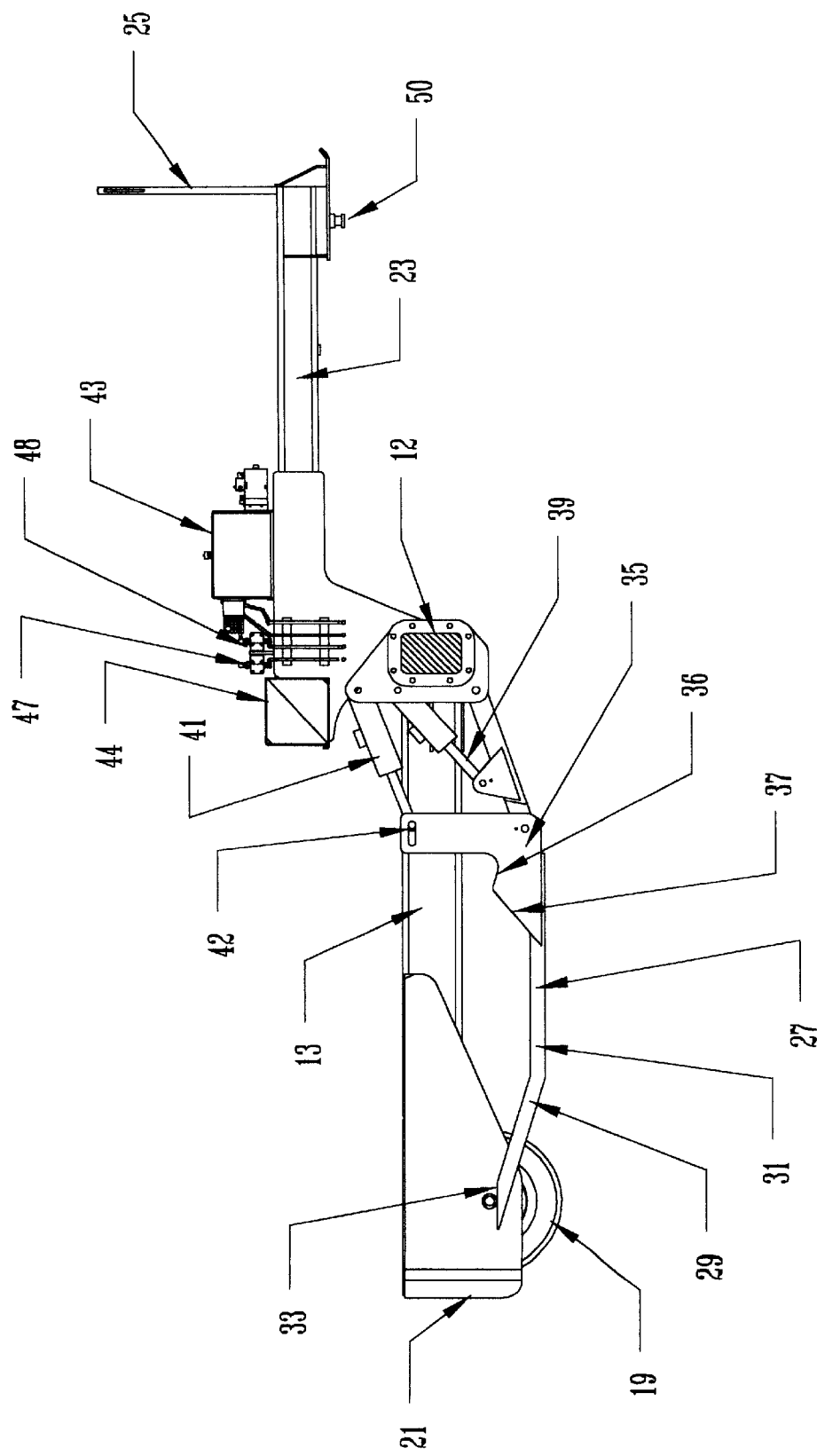
FIG. 5 is a schematic cross-sectional view of the present invention taken from line 5—5 of FIG. 3.

With reference now to the drawings, and in particular to FIGS. 1 through 11 thereof, a new forklift attachment embodying the principles and concepts of the present invention and generally designated by the reference numeral 10 will be described.

The forklift attachment 10 is designed for attachment to a fifth-wheel 19,20 hitch assembly of a vehicle 1 for permitting the lifting of loads such as rail bogies 2,3 by the forklift attachment 10. As best illustrated in FIGS. 1 through 11, the forklift attachment 10 generally comprises a ground engaging support carriage 11 having a towing tongue 23 designed for attachment to a fifth-wheel 19,20 hitch assembly of a vehicle 1. A pair of lifting arms 26,27 are pivotally mounted to the support carriage 11. A pair of lifting devices 38,39 are provided for raising and lowering the lifting arms 26,27 with respect to the support carriage 11 and a pair of tilting devices 40,41 are provided for tilting the lifting arms 26,27 with respect to the support carriage 11.

Specifically, the support carriage 11 has a cross member 12 and a pair of spaced apart arm members 13,14 outwardly extending in a first direction from the cross member 12 of the support carriage 11. The arm members 13,14 are preferably spaced apart a predetermined distance to permit positioning of a rail bogie 2,3 therebetween. The cross member 12 and the arm members 13,14 of the support carriage 11 each have a longitudinal axis. Preferably, the longitudinal axes of the arm members 13,14 are extended generally parallel to one another. Also preferably, the longitudinal axis of the cross member 12 is extending generally perpendicular to the longitudinal axes of the arm members 13,14. Ideally, the longitudinal axes of the cross member 12 and the arm members 13,14 of the support carriage 11 generally lie in a common plane.

In a preferred embodiment, the cross member 12 has a pair of separable end portions 15,16 with one end portion of the cross member located adjacent one of the arm members and another of the end portions of the cross member located adjacent another of the arm members. The end portions 15,16 of the cross member 12 are detachable from a remainder middle portion of the cross member 12 such that the width of the support carriage 11 can be reduced for easier transport of the forklift attachment 10 without dismantling the electrical and hydraulic systems.

Figure 9:
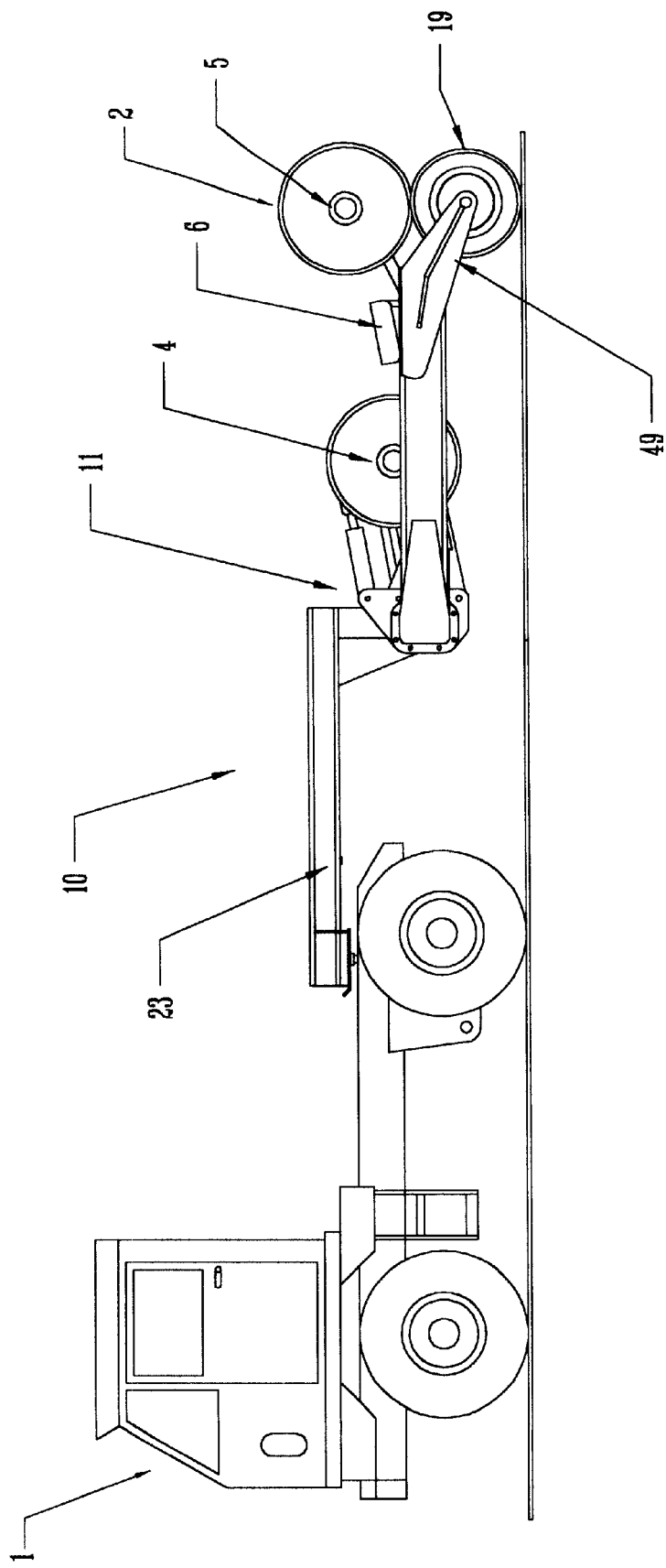
FIG. 9 is a schematic side view of an embodiment the present invention with the optional wheel mounting plates attached to the fifth-wheel assembly of a vehicle and carrying a rail bogie.
Figure 10:
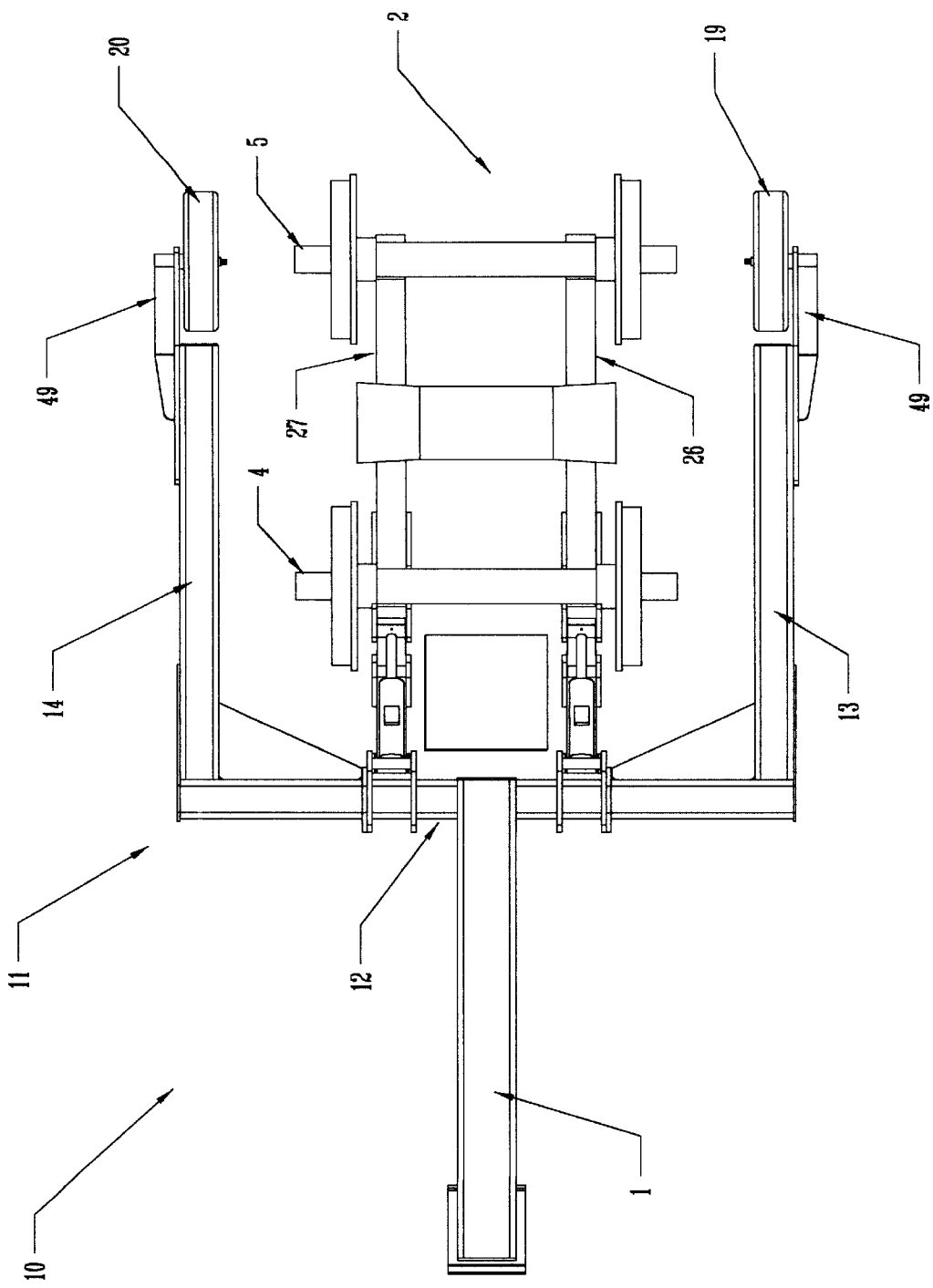
FIG. 10 is a schematic top plan view of an embodiment of the present invention with the optional wheel mounting plates illustrating the positioning of a rail bogie on the lifting arms.
Figure 11A:
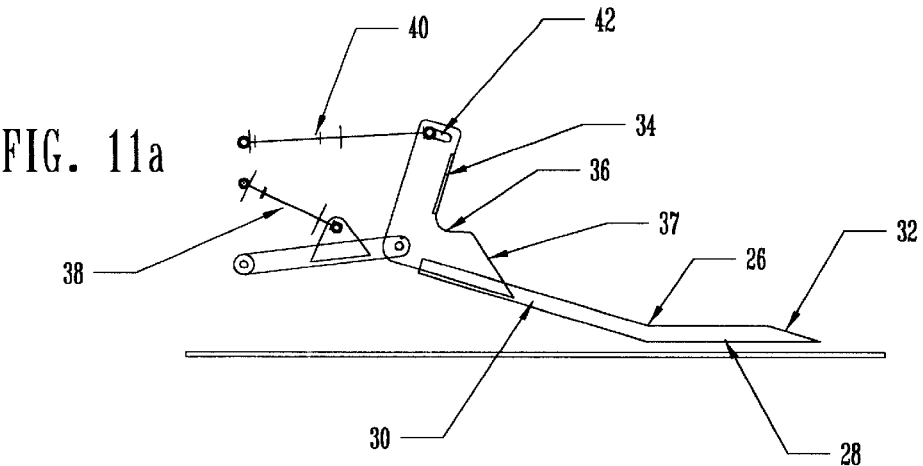
Figure 11B:
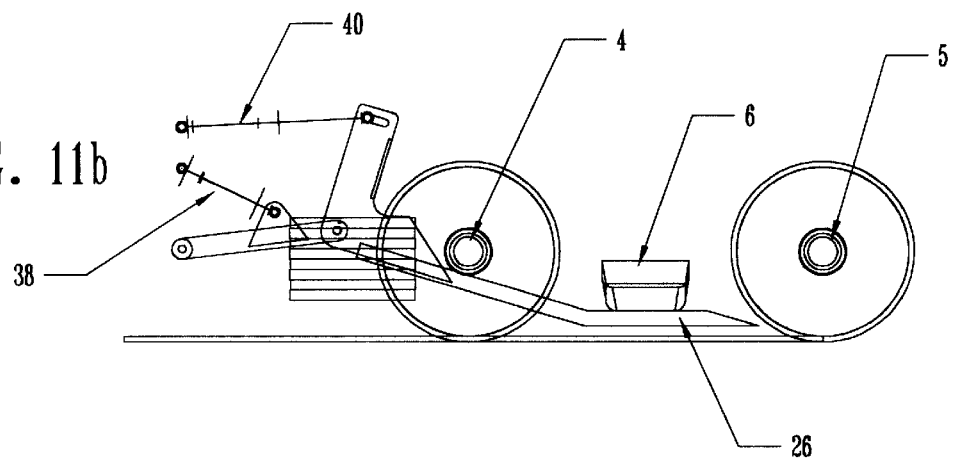
Figure 11C:
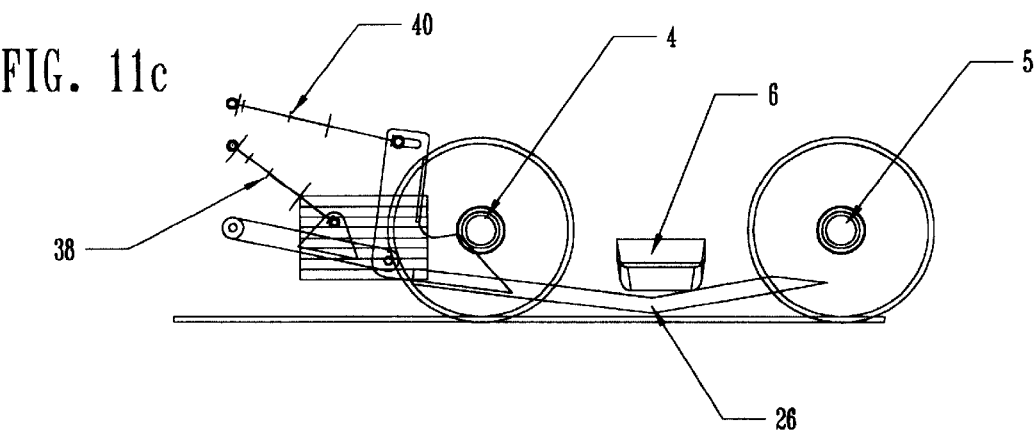
Figure 11D:
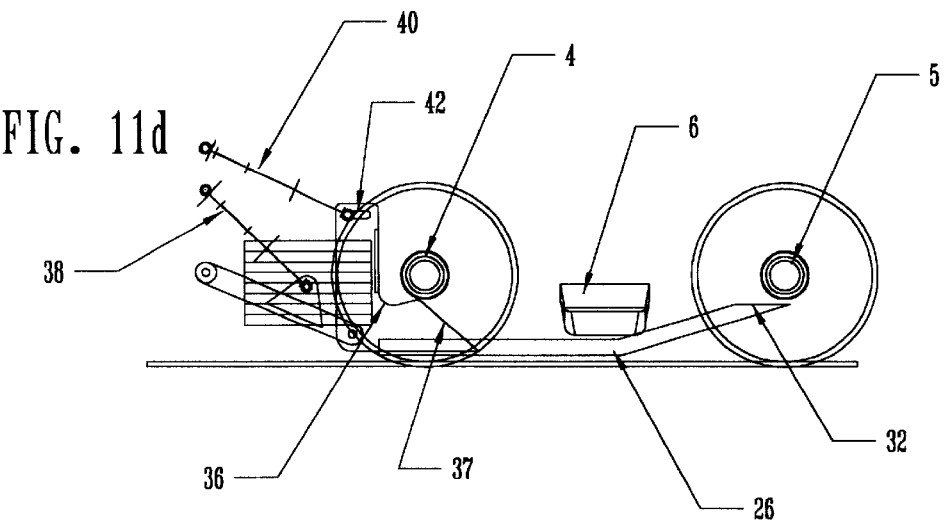
Figure 11E:
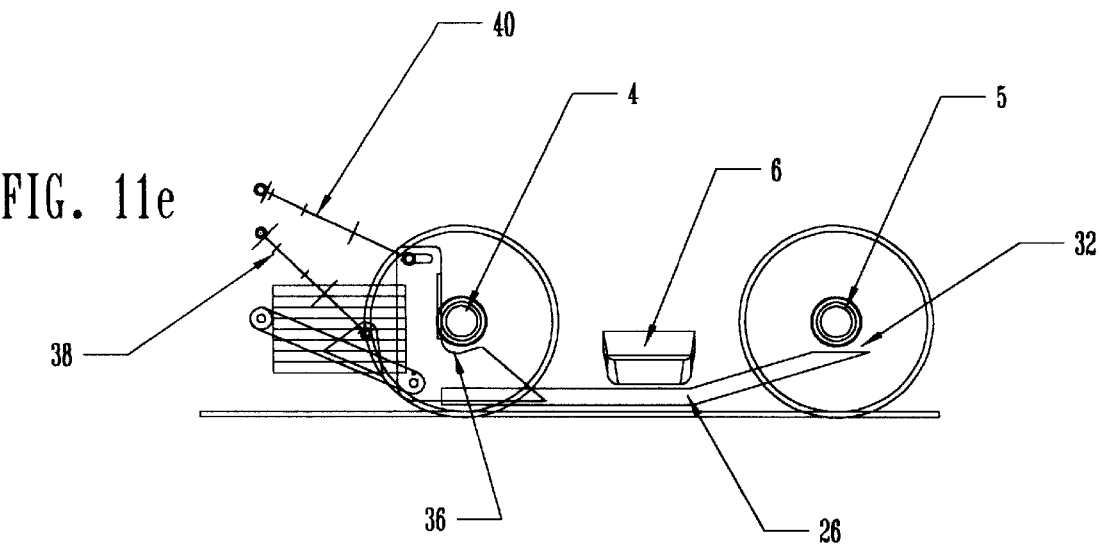
Figure 11F:
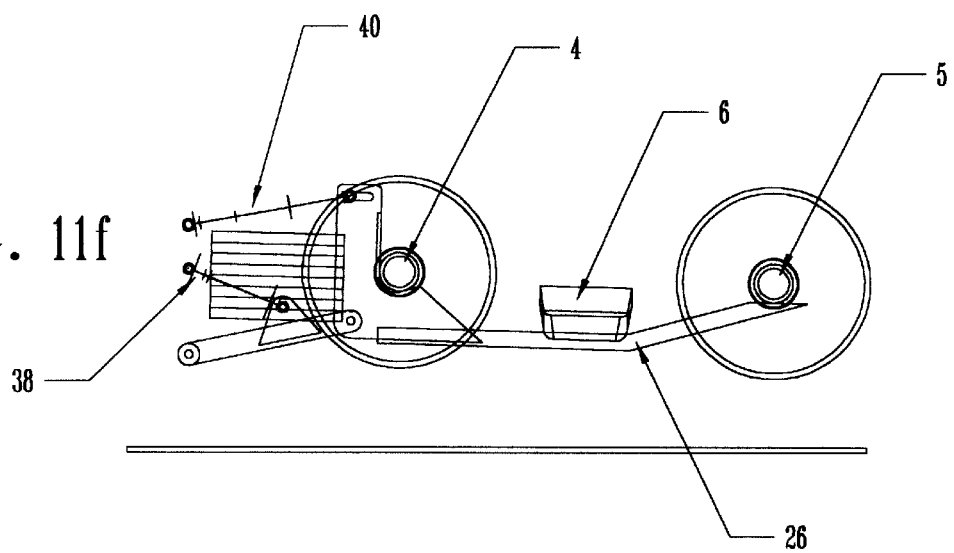

Each of the arm members 13,14 terminates at a terminal end 17,18 distal the cross member 12. Each of the arm members 13,14 has a ground engaging wheel 19,20 rotatably mounted to the terminal end 17,18 of the respective arm member 13,14. Preferably the wheels 19,20 have solid rubber tires and are designed for carrying a large portion of a load lifted by the forklift attachment 10. In an ideal embodiment, each arm member 13,14 has a wheel mounting plate 21,22 rotatably mounting the associated wheel 19,20 to the respective arm member 13,14. The wheel mounting plates 21,22 are coupled to the insides of the arm members 13,14. In use, the wheel mounting plates 21,22 are designed for providing a bumper for protect the wheels 19,20 from damage and for properly aligning the forklift attachment 10 while backing into a rail bogie 2,3. Optionally, as illustrated in FIGS. 9 and 10, the wheels 19,20 may be mounted to a non-protective mounting plate 49 that is attached to the outside of the associated arm member. This optional embodiment is satisfactory for mounting the wheels to the support carriage but does not protect the wheels from contact with a rail bogie between the arm members.

The support carriage 11 has a towing tongue 23 designed for attachment to a fifth-wheel 19,20 hitch assembly of a vehicle 1. The towing tongue 23 is outwardly extended from the cross member 12 of the support carriage 11 in a second direction opposite the first direction away from the arm members 13,14. The towing tongue 23 has a longitudinal axis and terminates at a free end 24. The free end 24 of the towing tongue 23 has a king pin 50 designed for mounting to the fifth wheel 19,20 hitch assembly of the vehicle 1. Preferably, the longitudinal axis of the towing tongue 23 is extended generally perpendicular to the longitudinal axis of the cross member 12 and generally parallel to the longitudinal axes of the arm members 13,14. Even more preferably, the towing tongue 23 is telescopically extendable along the longitudinal axis of the towing tongue 23 to permit lengthening and shortening of the towing tongue 23 such that it may be hitched to any type of yard truck or any road tractor 1. An elongate cable carrier 25 may preferably be upwardly extended from the towing tongue 23 adjacent the free end 24 of the towing tongue 23. In use, the cable carrier 25 is designed for holding cables extending between the forklift attachment 10 and the towing vehicle 1.

A spaced apart pair of lifting arms 26,27 are pivotally mounted to the cross member 12 of the support carriage 11. The lifting arms 26,27 are located between the arm members 13,14 of the support carriage 11. In use, the lifting arms 26,27 are designed for supporting a load thereon such as a rail bogie 2,3. Each of the lifting arms 26,27 has a length extending generally parallel to one another and generally perpendicular to the cross member 12 of the support carriage 11. Each of the lifting arms 26,27 has adjacent elongate first and second portions 28,29,30,31. The second portion 30,31 of each lifting arm 26,27 is positioned between the cross member 12 and the first portion 28,29 of the respective lifting arm 26,27. Each of the first and second portions 28,29,30,31 of each of the lifting arms 26,27 has a longitudinal axis. The longitudinal axis of the first portion 28,29 of each lifting arm 26,27 is extended at an acute angle from the longitudinal axis of the second portion 30,31 of the respective lifting arm 26,27 to form a bend in each lifting arm 26,27. Preferably, the acute angle is between about 10 degrees and about 25 degrees. Even more preferably, the acute angle is between about 15 degrees and about 20 degrees. Ideally, the acute angle is about 16.845 degrees. Each of the lifting arms 26,27 terminates in a generally flat distal end 30,31 located adjacent the first portion 28,29 of the respective lifting arm 26,27. The distal end 30,31 of each lifting end lies in a plane generally parallel to the longitudinal axis of the second portion 30,31 of the respective lifting arm 26,27. Ideally, the distal ends 30,31 of the lifting arms 26,27 are positioned along line extending between the axles of the wheels 19,20 of the support carriage 11. In use, the lifting arms 26,27 are designed with the bend in them to allow them to be slid and rotated under the pan 6 of the rail bogie 2,3. Upon reaching proper placement, the fork will be in position to lift on the front and rear axles 4,5 of the rail bogie 2,3 without coming into contact with the pan 6. The flat distal ends 30,31 allow proper placement under the outer bogie axle 5.

Each lifting arm 26,27 has a pair of holding ramps 34,35 coupled to the second portion 30,31 of the respective lifting arm 26,27. The holding ramps 34,35 preferably lie in generally parallel planes extending generally vertical from the respective lifting arm 26,27. Each of the ramps 34,35 has a notched portion 36 and an angled portion 37 extending between the notched portion 36 and the second portion 30,31 of the respective lifting arm 26,27. The angled portions 37 of the ramps 34,35 extend at an acute angle with the longitudinal axis of the respective second portion 30,31. In use, the notched portions 36 are designed for cradling the inner axle 4 of the rail bogie 2,3. The angled portion 37 is designed for aiding sliding of the lifting arms 26,27 underneath the inner axle 4 of the rail bogie 2,3 and to guide the inner axle 4 of the rail bogie into the notched portions 36.

A pair of lifting devices 38,39 are provided for raising and lowering the lifting arms 26,27 with respect to the plane of the cross member 12 and arm members 13,14 of the support carriage 11. Preferably, each of the lifting devices 38,39 comprises a fluidic piston-cylinder actuator. A first lifting device of the pair of lifting devices is pivotally connected to the cross member of the support carriage and one of the lifting arms and a second lifting device of the pair of lifting devices is pivotally connected to the cross member of the support carriage and another of the lifting arms. A pair of tilting devices 40,41 are also provided for tilting the lifting arms 26,27 with respect to the plane of the cross member 12 and arm members 13,14 of the support carriage 11. Preferably, each of the tilting devices 40,41 comprises a fluidic piston-cylinder actuator. A first tilting device of the pair of tilting devices 40,41 is pivotally connected to the cross member of the support carriage and slidably connected to the ramp of one of the lifting arms by a pin and slot coupling 42 and a second tilting device of the pair of tilting devices is pivotally connected to the cross member of the support carriage and slidably connected to the ramp of another of the lifting arms by a similar pin and slot coupling 42. The pin and slot coupling 42 allows the fork tip to float over the ground as it is being slid under or pulled out from a rail bogie.

Figure 6:
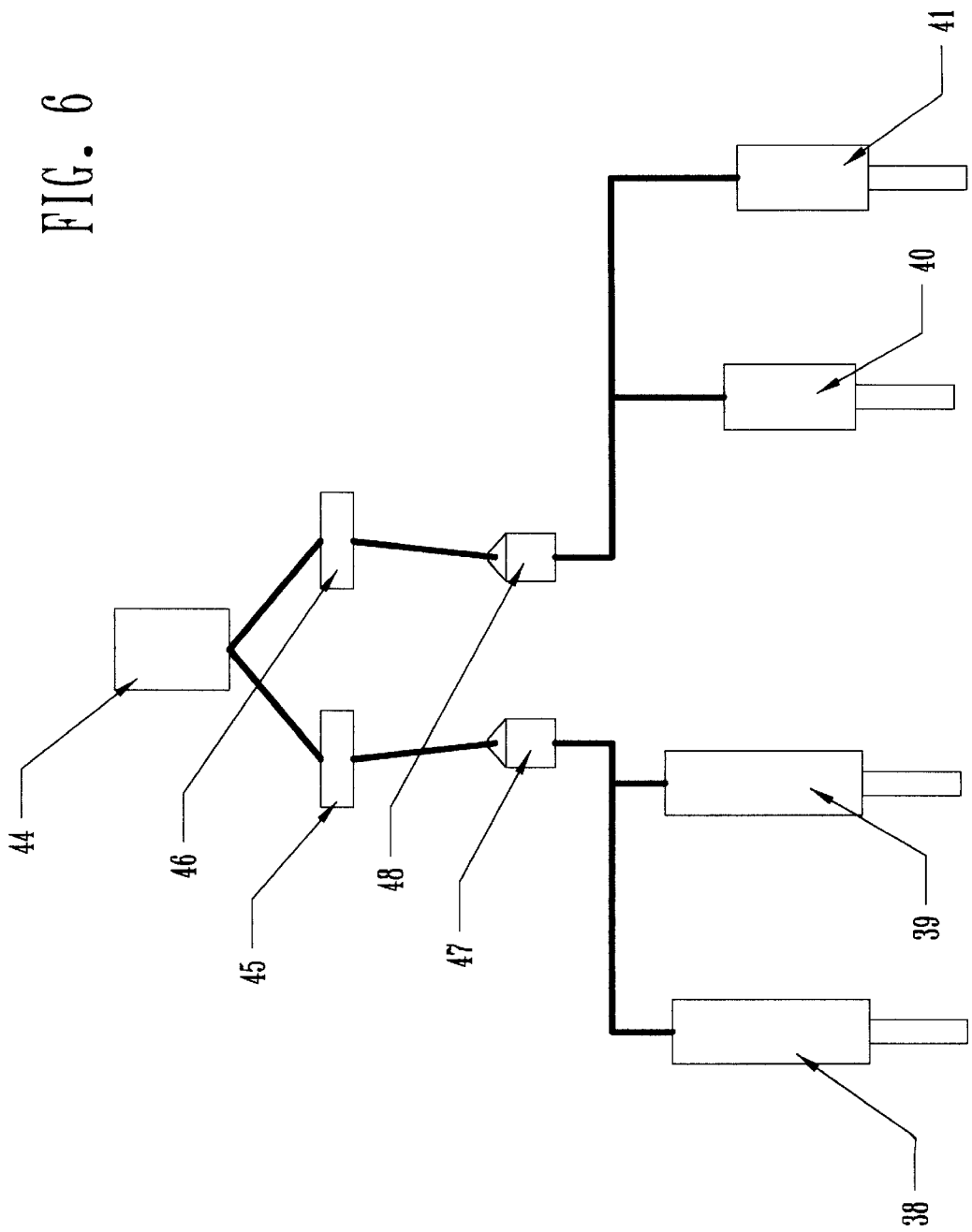
FIG. 6 is a schematic flow diagram of the hydraulic system of the present invention.

With particular reference to FIG. 6, a hydraulic pump 43 is in fluid communication with the lifting and tilting devices 40,41 for pumping fluid to the lifting and tilting devices 40,41 to permit actuating of the fluidic piston-cylinder actuators. The hydraulic pump 43 is preferably mounted to the support carriage 11. A battery 44 is preferably electrically connected to the hydraulic pump 43 for powering the hydraulic pump 43. The battery 44 is also preferably mounted to the support carriage 11. Ideally, power cables may also be used to electrically connect the hydraulic pump 43 to the power plant of the towing vehicle 1. The battery 44 is preferably connected to the yard tractor's electrical system for recharging. The hydraulic pump may also be powered directly from the yard tractor's battery 44. The hydraulic system is preferably controlled by a wireless radio system, backed up by a remote control cable with push button pendant.

First and second directional control valves 45,46 are provided for directing hydraulic fluid from the hydraulic pump 43 to the lifting and tilting devices 40,41. The first directional control valve 45 is fluidly connected between the hydraulic pump 43 and the lifting devices 38,39. The second directional control valve 46 is fluidly connected between the hydraulic pump 43 and the tilting devices 40,41. Because there is no mechanical link between the two lifting arms, first and second flow dividers 47,48 are provided for forming a parallel link between the lifting arms 26,27 when lifting and tilting the lifting arms 26,27 so that the lifting arms 26,27 are kept together in a common plane as they are lifted and tilted. The first flow divider 47 is fluidly connected between the first directional control valve 45 and the lifting devices 38,39. The second flow divider 48 is fluidly connected between the second directional control valve 46 and the tilting devices 40,41. The flow dividers 47,48 are preferably of the type similar to the model GD05EE00-GV Flow Divider manufactured by Viking Pump, 406 State Street, Cedar Falls, Iowa 50613. This type of flow divider is a turning gear divider that divides the oil flow into two equally metered parts. It also has a relief valve built into it so the two fluidic piston-cylinder actuator can be "sequenced" at the end of the stroke.

In use, the forklift attachment 10 is designed to enable a yard truck or any vehicle 1 with a 5th wheel plate the capability to pick up and move rail bogies including end rail bogies 3 and intermediate rail bogies 2 such as the type manufactured by Wabash National Corporation, P.O. Box 6129 Lafayette, Ind. 47903 under the trade names Coupler-Mate Rail Bogie (for end rail bogies 3) and Intermediate Rail Bogie (for intermediate rail bogies 2). The forklift attachment 10 can be used to pick a rail bogie 2,3 off the railroad track or yard and can place the rail bogie 2,3 back on the tracks or in the yard. An advantage of the forklift attachment 10 is that it allows a terminal operator the convenience of using one main vehicle 1 to move the trailers or the bogies. The cost of a forklift that has the size necessary to move the bogies is very large. The forklift must be able to pick up and carry 19,000 pounds (the typical weight of an end rail bogie 3) at a distance of 50 inches out away from the mast of the forklift. Furthermore, some type of tractor is always necessary to move the trailers onto and off the track line, normally a yard or hostler tractor. Therefore, it is cost effective to use the vehicle 1 to move the bogies as well as the trailers. The forklift attachment 10 is designed to couple to the yard tractors fifth wheel plate. The forklift attachment 10 is designed so the lifting arms 26,27 can be lowered to the ground, using them for a "parking stand" when the yard truck is separated from it. A counter weight is preferably included inside the terminal ends 17,18 of the arm members 13,14 so that the forklift attachment 10 will not "nosedive" when parked on the lifting arms 26,27. The trailing ability, and the load suspension of the forklift attachment 10 gives the operator a much greater moving speed, especially on the longer distant moves between tracks and/or yards. The load is centered between the wheels 19,20 of the forklift attachment 10, and the yard truck 1 giving a much more stable ride than when the rail bogie is being overhung on the fork of a forklift.

Figure 7:
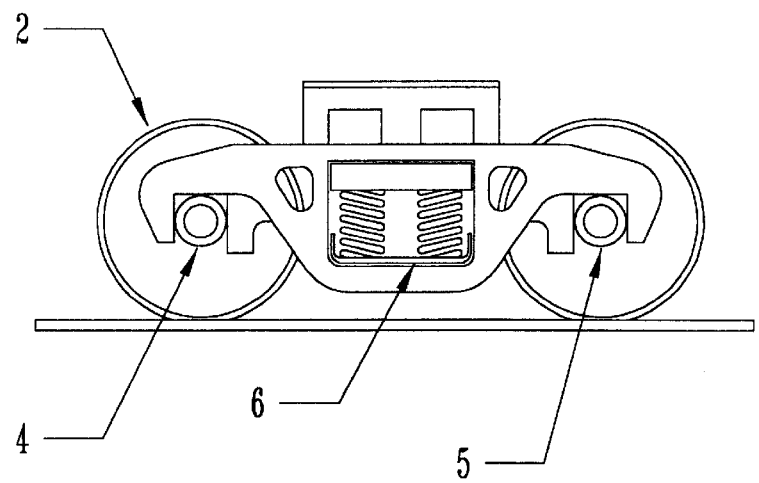
FIG. 7 is a schematic side view of an intermediate rail bogie.
Figure 8:
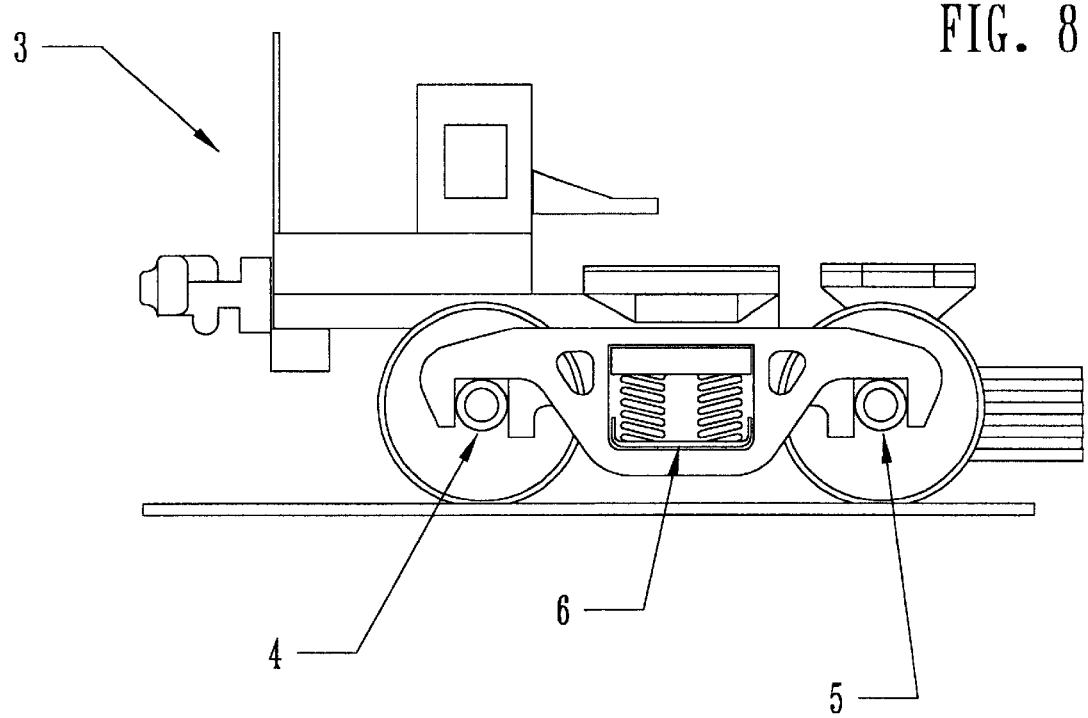
FIG. 8 is a schematic side view of an end rail bogie.

To explain the design of the lifting arms 26,27 of the forklift attachment 10, it is necessary to know how rail bogies 2,3 are built regarding the relationship of its main body to the axles and suspension. With particular reference to FIGS. 7 and 8, the main body of either of the rail bogies 2,3 is set onto the axle journals or bearing mounted on the axles 4,5, being separated by a spring suspension system. The axles 4,5 are designed to accept the load from the top only, and are not designed to have any loading from the bottom. The axles 4,5 are kept in place by a retainer or ear bolted under each end of each axle. These ears can be easily broken off if the rail bogies are handled improperly. Also, if improperly handled, the coil spring suspension mounted between the main body of the bogie and journal housing can be cocked out of position, causing broken coil springs. The bogies have a pan 6 that is mounted between the two axles, several inches lower than the axles. Since this pan 6 is part of the main body of the bogie, lifting on it will also result in improper lifting on the suspension and axles of the bogie which can break the retainer ears or cock the springs. Therefore, proper lifting must be done on the axle/wheel assemblies 4,5 only.

With particular reference to FIGS. 11a–g, the lifting arms are designed with the bend in them to allow the lifting arms to be slid and rotated under the above mentioned pan 6 section of the bogie. Upon reaching proper placement, the fork will be in position to lift on the front and rear axles 4,5 of the bogie, without coming into contact with the above mentioned pan 6 section. The distal ends of the lifting arms are designed to allow proper placement under the rail bogie outer axle 5. The notched portions 36 are designed to cradle the inner axle 4 of the rail bogie. The angled portions are formed on the ramps so the lifting arms 26,27 can be slid easily under the axle 4. The lifting devices control the lifting of the lifting arms while the tilting devices control the tilt of the lifting arms (as illustrated in sequence in FIGS. 11d–g where second portions of the lifting arms are tilted from a horizontal position in FIG. 11d to a tilted position in FIG. 11g)

The end rail bogie 3 has a large counterweight that protrudes out from the end of the end rail bogie 3, which is picked up by the forklift attachment 10. Because of the clearance issue and position of the counterweight, the two fork assemblies cannot have a mechanical link between them. For this reason the lifting arms 26,27 are protruded out away from the main frame of the forklift attachment 10 by the lower arm and upper cylinder.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A forklift attachment for towing behind a vehicle having a hitch assembly, comprising:

a support carriage having a towing tongue with a forward end and a rearward end, the forward end of said towing tongue being adapted for attachment to the hitch assembly of the vehicle, a cross member coupled to the rearward end of the towing tongue, and a pair of laterally spaced arm members extending in a rearward direction from said cross member, each of said arm members having a rearward end, and a ground engaging means mounted to each of said arm members for engaging a ground surface;

a pair of lifting arms each having a front end and a rear end, each of the front ends being pivotally mounted to the cross member of said support carriage and extending rearward from said cross member between said arm members, said lifting arms being laterally spaced from each other for positioning below portions of an article to be lifted;

a pair of lifting devices for raising and lowering said lifting arms with respect to said support carriage; and a pair of tilting devices for tilting said lifting arms with respect to a ground surface on which the ground engaging means of said support carriage is engaged;

wherein each of said lifting arms has adjacent elongate first and second portions, each of said first and second portions of each of said lifting arms having a longitudinal axis, said longitudinal axis of said first portion of each lifting arm being extended at an acute angle from said longitudinal axis of said second portion of the respective lifting arm.

2. The forklift attachment of claim 1, wherein the ground engaging means comprises a ground engaging wheel rotatably mounted to said terminal end of the respective arm member.

3. The forklift attachment of claim 2, wherein each arm member has a wheel mounting plate rotatably mounting the associated wheel to the respective arm member, each of said wheel mounting plates extending downwardly from said arm member toward and adjacent to the ground surface below said wheel for protecting said wheel from articles moved into the space between said arm members.

4. The forklift attachment of claim 2, wherein said cross member has a pair of separable end portions, one end portion of said cross member being located adjacent one of said arm members, another of said end portions of said cross member being located adjacent another of said arm members, said end portions of said cross member being detachable from a remainder middle portion of said cross member.

5. The forklift attachment of claim 1, wherein said cross member and said arm members of said support carriage each have a longitudinal axis, said longitudinal axes of said arm members being extended generally parallel to one another, said longitudinal axis of said cross member being extending generally perpendicular to said longitudinal axes of said arm members.

6. The forklift attachment of claim 5, wherein said longitudinal axes of said cross member and said arm members of said support carriage generally lie in a common plane.

7. The forklift attachment of claim 1, wherein said towing tongue has a longitudinal axis and terminates at a free end, wherein said free end of said towing tongue having has a king pin adapted for mounting to the hitch assembly of the vehicle, and wherein said towing tongue is telescopically extendable along said longitudinal axis of said towing tongue.

8. The forklift attachment of claim 1, further comprising an elongate cable carrier being upwardly extended from said towing tongue.

9. The forklift attachment of claim 1, wherein each of said first and second portions of said lifting arms having an upper contacting surface available for contacting an article, the upper contacting surface of the first portion having a length substantially equal to the a length of the upper contacting surface of the second portion.

10. The forklift attachment of claim 1, wherein said acute angle is between about 10 degrees and about 25 degrees.

11. The forklift attachment of claim 1, wherein said acute angle is between about 15 degrees and about 20 degrees.

12. The forklift attachment of claim 1, wherein said acute angle is about 16.845 degrees.

13. The forklift attachment of claim 1, wherein each of said lifting arms terminates with a generally flat distal end located adjacent said first portion of the respective lifting arm, said distal end of each lifting end lying in a plane generally parallel to said longitudinal axis of said second portion of the respective lifting arm.

14. The forklift attachment of claim 1, wherein each of said lifting arms has a holding ramp coupled to said second portion of the lifting arm, each of said ramps having a notched portion and an angled portion extending between said notched portion and said second portion of the respective lifting arm for engaging a portion of an article cradled on said lifting arms.

15. The forklift attachment of claim 1, wherein said lifting and raising devices each comprise a fluidic piston-cylinder actuator.

16. The forklift attachment of claim 15, wherein a hydraulic pump is in fluid communication with said lifting and tilting devices for pumping fluid to said lifting and tilting devices, wherein first and second directional control valves are provided for directing hydraulic fluid from said hydraulic pump to said lifting and tilting devices, said first directional control valve being fluidly connected between said hydraulic pump and said lifting devices, said second directional control valve being fluidly connected between said hydraulic pump and said tilting devices, wherein first and second flow dividers are provided for forming a parallel link between said lifting arms when lifting and tilting said lifting arms so that said lifting arms are kept together in a common plane as they are lifted and tilted, said first flow divider being fluidly connected between said first directional control valve and said lifting devices, said second flow divider being fluidly connected between said second directional control valve and said tilting devices.

17. A forklift attachment for attachment to a fifth-wheel hitch assembly of a vehicle for permitting the lifting of loads by said forklift attachment, said forklift attachment comprising:

a support carriage having a cross member and a pair of spaced apart arm members outwardly extending from said cross member of said support carriage;

said cross member and said arm members of said support carriage each having a longitudinal axis, said longitudinal axes of said arm members being extended generally parallel to one another, said longitudinal axis of said cross member being extending generally perpendicular to said longitudinal axes of said arm members;

said longitudinal axes of said cross member and said arm members of said support carriage generally lying in a common plane;

said cross member having a pair of separable end portions, one end portion of said cross member being located adjacent one of said arm members, another of said end portions of said cross member being located adjacent another of said arm members, said end portions of said cross member being detachable from a remainder middle portion of said cross member;

each of said arm members terminating at a terminal end distal said cross member;

each of said arm members having a ground engaging wheel rotatably mounted to said terminal end of the respective arm member, wherein each arm member has a wheel mounting plate rotatably mounting the associated wheel to the respective arm member;

said support carriage having an towing tongue adapted for attachment to a fifth-wheel hitch assembly of a vehicle, said towing tongue being outwardly extended from said cross member of said support carriage, said towing tongue having a longitudinal axis and terminating at a free end;

said free end of said towing tongue having a king pin adapted for mounting to the fifth wheel hitch assembly of the vehicle said longitudinal axis of said towing tongue being extending generally perpendicular to said longitudinal axis of said cross member generally parallel to said longitudinal axes of said arm members;

wherein said towing tongue is telescopically extendable along said longitudinal axis of said towing tongue;

an elongate cable carrier being upwardly extended from said towing tongue adjacent said free end of said towing tongue;

a spaced apart pair of lifting arms being pivotally mounted to said cross member of said support carriage, said lifting arms being located between said arm members of said support carriage;

each of said lifting arms having a length extending generally parallel to one another and generally perpendicular to said cross member of said support carriage;

each of said lifting arms having adjacent elongate first and second portions, said second portion of each lifting arm being positioned between said cross member and said first portion of the respective lifting arm;

each of said first and second portions of each of said lifting arms having a longitudinal axis, said longitudinal axis of said first portion of each lifting arm being extended at an acute angle from said longitudinal axis of said second portion of the respective lifting arm, wherein said acute angle is about 16.845 degrees;

each of said lifting arms terminating a generally flat distal end located adjacent said first portion of the respective lifting arm, said distal end of each lifting end lying in a plane generally parallel to said longitudinal axis of said second portion of the respective lifting arm;

each of said lifting arms having a holding ramp coupled to said second portion of the respective lifting arm, said holding ramps lying in generally parallel planes, each of said holding ramps having a notched portion and an angled portion extending between said notched portion and said second portion of the respective lifting arm;

a pair of lifting devices for raising and lowering said lifting arms with respect to said support carriage, wherein each of said lifting devices comprises a fluidic piston-cylinder actuator, a first lifting device of said pair of lifting devices being connected to said cross member of said support carriage and one of said lifting arms, a second lifting device of said pair of lifting devices being connected to said cross member of said support carriage and another of said lifting arms; and a pair of tilting devices for tilting said lifting arms with respect to said support carriage, wherein each of said tilting devices comprises a fluidic piston-cylinder actuator, a first tilting device of said pair of tilting devices being connected to said cross member of said support carriage and one of said lifting arms, a second tilting device of said pair of tilting devices being connected to said cross member of said support carriage and another of said lifting arms.

18. A forklift attachment for towing behind a vehicle having a hitch assembly, comprising:

a support carriage having a towing tongue with a forward end and a rearward end, the forward end of said towing tongue being adapted for attachment to the hitch assembly of the vehicle, a cross member coupled to the rearward end of the towing tongue, and a pair of laterally spaced arm members extending in a rearward direction from said cross member, each of said arm members having a rearward end, and a wheel rotatably mounted rearward of said cross member on each of said arm members for engaging a ground surface, said wheels rotating about a substantially common rotational axis;

a pair of lifting arms each having front ends and rear ends, the front ends being pivotally mounted to the cross member of said support carriage and extending rearward from said cross member between said arm members, said lifting arms being laterally spaced from each other for positioning below portions of an article to be lifted, said lifting arms having a rearward terminal free end; and a pair of lifting devices for raising and lowering said lifting arms with respect to said support carriage;

wherein the terminal free ends of the lifting arms do not extend substantially beyond the common rotational axis of the wheels such that an article lifted by the lifting arms is supported forward of the common rotational axis for shifting the weight of the article toward said towing tongue.

19. The forklift attachment of claim 18, additionally comprising a pair of tilting devices for tilting said lifting arms with respect to a ground surface on which the ground engaging means of said support carriage is engaged.

20. The forklift attachment of claim 18, wherein each of said lifting arms has adjacent elongate first and second portions, each of said first and second portions of each of said lifting arms having a longitudinal axis, said longitudinal axis of said first portion of each lifting arm being extended at an acute angle from said longitudinal axis of said second portion of the respective lifting arm.

* * * * *